United States Patent [19]

Park

[11] Patent Number: 5,457,777
[45] Date of Patent: Oct. 10, 1995

[54] SCREEN EDITOR FOR VIDEO PRINTER

[75] Inventor: Sang-sin Park, Suwon, Rep. of Korea

[73] Assignee: Samsung Electronics Co., Ltd., Kyungki, Rep. of Korea

[21] Appl. No.: 889,381

[22] Filed: May 28, 1992

[30] Foreign Application Priority Data

Aug. 20, 1991 [KR] Rep. of Korea ............... 91-14352

[51] Int. Cl.$^6$ .................................................. G06F 15/00
[52] U.S. Cl. .......................... 395/162; 395/164; 395/115
[58] Field of Search .............................. 345/7, 9, 27, 28, 345/113, 115, 118, 119, 120, 200, 201, 203; 364/242.4, 243; 358/310, 311; 395/118, 121, 133, 134, 135, 138, 157, 164, 166, 400, 425

[56] References Cited

U.S. PATENT DOCUMENTS

| | | | |
|---|---|---|---|
| 4,951,229 | 8/1990 | DiNicola et al. | 364/521 |
| 5,061,919 | 10/1991 | Watkins | 340/721 |
| 5,146,592 | 9/1992 | Pfeiffer et al. | 395/157 |
| 5,327,156 | 7/1994 | Masukane et al. | 345/113 |

Primary Examiner—Mark R. Powell
Assistant Examiner—U. Chauhan
Attorney, Agent, or Firm—Sughrue, Mion, Zinn, Macpeak & Seas

[57] ABSTRACT

A screen editor and screen editing method for extracting part of one screen to insert it into another screen includes first and second memories for storing input screen data, an output selection switch for transmitting either of the screen data read out from the first or second memories, a coordinates designator for designating an extracted region of the second memory and an inserting reference point of the first memory, a controller for calculating editing data containing the addresses of the inserting reference point, extracting reference point and region increments, and controlling the memories and coordinates designator, and an address generator for generating the read addresses of the first and second memories and controlling the output selection switch.

7 Claims, 6 Drawing Sheets

SCREEN EDITOR FOR VIDEO PRINTER

BACKGROUND OF THE INVENTION

The present invention relates to screen editing for a video printer, and more particularly to a screen editing method which does not damage the contents of screens to be edited when forming an edited screen.

FIG. 1 shows a block diagram of a conventional video printer. The video printer in FIG. 1 receives two screens of data and stores them into respective memories to selectively output each. When printing two screens, the video printer solves the inconvenience of sequentially inputting and printing the data of each screen.

The video printer of FIG. 1 stores or outputs screen information by fields. An input video signal is a digitized analog signal suitable for storing the screen information into a memory. The memory for storing the screen information has a sufficient capacity for storing fields of screen information. For instance, given that the number of vertical samplings of a screen is M, the number of horizontal samplings is N, and the resolution per sampled pixel is Q bits, the minimum capacity of the memory becomes Q×M×N bits. In order to store two screens worth of data, two memories each having the minimum memory capacity, or one memory having twice the minimum memory capacity may be used. In FIG. 1, two memories having the minimum memory capacity are used and have the same memory regions (same addresses).

Input screen information is distributed to memories 120 and 130 according to an input selection signal SELECT_IN as well as a memory read/write signal R/W from a controller 150 and an address signal ADDR from an address generator 140. For example, when the input screen information is written into first memory 120, controller 150 controls input selection signal SELECT_IN so that an input selection switch 110 selects the path to first memory 120, and sets memory read/write signal R/W so as to establish a write mode. Controller 150 also applies an address generating signal ADDR_GEN to address generator 140 which in turn starts to operate. Address signal ADDR generated from address generator 140 is then supplied to first memory 120 to designate an address where the screen information via input selection switch 110 is to be written.

The screen information written in memories 120 and 130 is selectively output to an unshown thermal print head (TPH) and is printed according to an output selection signal SELECT_OUT together with memory read/write signal R/W from controller 150 and address signal ADDR from address generator 140. For instance, when the screen information written in first memory 120 is printed, controller 150 controls output selection signal SELECT_OUT so that an output selection switch 160 selects the path to first memory 120, and sets memory read/write signal R/W so as to establish a read mode. Controller 150 applies an address generating signal ADDR_GEN to address generator 140 which in turn starts to operate. Address signal ADDR generated from address generator 140 is supplied to first memory 120 to designate a read address.

Now, referring to FIG. 2 showing a reading out process of screen information, operation of reading out the screen information written in memories 120 and 130 and supplying the information to the TPH, is described. In FIG. 2, the location of pixels constituting the screen information is indicated by a combination of a row address R and a column address C, and can be represented as coordinates (R,C). Here, the incrementing directions of row address R and column address C are denoted as Y and X, respectively, and the final values of row address R and column address C are Re and Ce. In reading and printing the screen information, pixels of the leftmost column, first, are read out and printed, and then pixels of the column immediately to the right thereof are read out and printed. This process is repeated until pixels of the rightmost column are read out and printed, to complete one screen printing operation. More specifically, in FIG. 2, among pixels constituting screen information, the pixel components of the leftmost column are read out in the order of: (0,0)→(1,0)→(2,0) . . . → (Re,0); and supplied to a line memory of the TPH so as to be printed. After all the pixels of the leftmost column are read out to be printed, pixels of the column immediately to the right thereof are read out and printed in the order of: (0,1)→(1,1)→(2,1) . . . → (Re,1). The process is repeated until a final column Ce, which is the completion of one screen printing operation.

The video printer of FIG. 1 is advantageous in the rapid input of screen information and the enhanced processing capacity of a video printer by storing two screens of data, selecting and printing each one individually. However, although the video printer of FIG. 1 can select and output one screen of data to be printed, the video printer has no function to extract part of a screen (subscreen) and insert it into another screen (main screen).

To include the screen editing function, the video printer of FIG. 1 may comprise an additional memory for screen editing. For instance, in the case of extracting part of the second memory and inserting it into the first memory to print it, first, the screen information of the first memory is stored in a separate memory. An extracted region of the second memory is read out and then overwrites a corresponding inserting region of the first memory in the separate memory, so that an edited screen is obtained. Finally, the edited screen is read out from the separate memory and printed. However, such a method needs an additional memory besides the screen editor so that the system becomes more expensive and slows the processing speed.

SUMMARY OF THE INVENTION

Therefore, it is an object of the present invention to provide an inexpensive apparatus for screen editing for a video printer.

It is a further object of the present invention to provide a video printer having a rapid screen editing function.

It is a still further object of the present invention to provide a screen editing method for performing a screen editing function in real time in a video printer.

To accomplish the objects, the screen editing method comprises the steps of: designating part of a secondary screen as an extracted region, and designating a location where the screen information of the extracted region is to be inserted in another screen; comparing the read address of a main screen with the address of the inserting region to recognize the inserting region; and reading out and outputting the screen information of the extracted region of the secondary screen in the inserting region.

The screen editor for a video printer comprises: first and second memories for storing input screen data; an output selection switch for sending either set of the screen data read out from the first and second memories; a coordinates designator for designating an extracted region of the second memory and an inserting reference point of the first memory; a controller for, based upon the coordinates of the coordinates designator, calculating editing data containing the addresses of the inserting reference point, extracting reference point and region increments, and controlling the memories and coordinates designator; and an address generator for, based upon the editing data of the controller, generating the read addresses of the first and second memories and controlling the output selection switch.

BRIEF DESCRIPTION OF THE DRAWINGS

The above objects and other advantages of the present invention will become more apparent by describing in detail a preferred embodiment of the present invention with reference to the attached drawings in which.

DETAILED DESCRIPTION OF THE INVENTION

Figure 3:
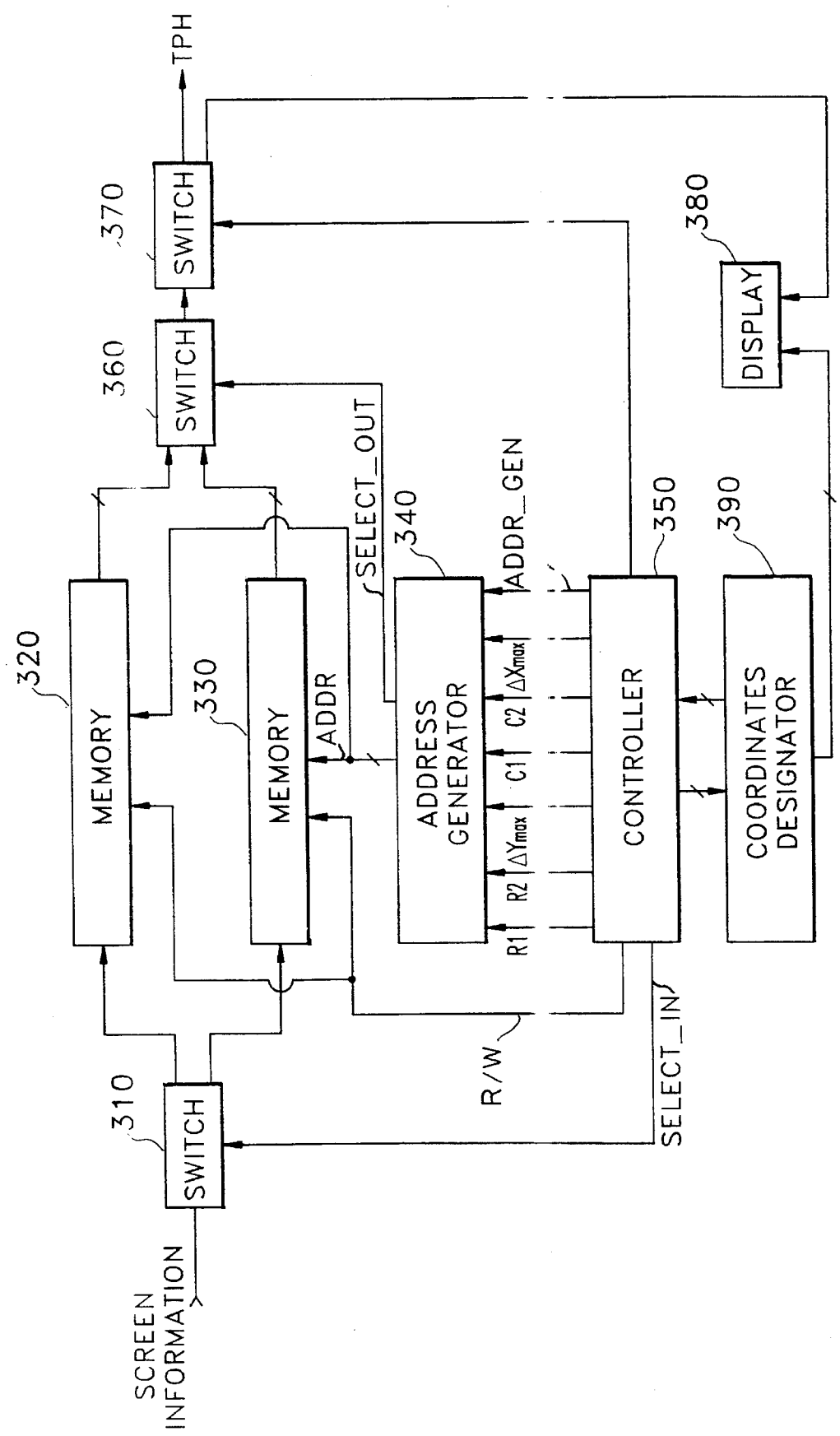
FIG. 3 illustrates a screen editor of the present invention.

In FIG. 3, input screen information is distributed to memories 320 and 330 according to an input selection signal SELECT_IN as well as a memory read/write signal R/W from a controller 350 and an address signal ADDR from an address generator 340. For example, when the input screen information is written into first memory 320, controller 350 controls input selection signal SELECT_IN so that an input selection switch 310 selects the path to first memory 320, and sets memory read/write signal R/W so as to establish a write mode. Controller 350 also applies an address generating signal ADDR_GEN and editing data to address generator 340 which in turn starts to operate. Address signal ADDR generated from address generator 340 is then supplied to first memory 320 to designate an address where the screen information via input selection switch 310 is to be written.

The screen information written in memories 320 and 330 is selected to be output or edited before being output, according to an output selection signal SELECT_OUT together with memory read/write signal R/W from controller 350, the editing data, and address signal ADDR from address generator 340.

A coordinates designator 390 designates an inserting reference point for the main screen stored in the first memory and two diagonal points for an extracted region of the subscreen stored in the second memory, and transmits the coordinates to controller 350. A second output selection switch 370 transmits the output from the screen editor of the present invention to the TPH so as to print it or, transmits the output to a display 380 to be previewed. Display 380 displays the output from the screen editor as a user-recognized form so as to ascertain an output screen in advance. Display 380 can also ascertain the inserting reference point and inserting region, being connected with coordinates designator 390. Controller 350 converts the inserting reference point and the coordinates for indicating the extracted region from coordinates designator 390 into editing data suitable for address generator 340 which receives them. Controller 350 stores the input screen information to first or second memory 320 or 330, sends the screen information from output selection switch 360 to the TPH or display 380, and performs other control functions for the system.

The screen editor of the present invention provides a screen editing method capable of editing a screen in real time wherein the inserting region for the main screen and the extracted region for the subscreen are simultaneously read out. The extracted region of the subscreen is then switched with the inserting region of the main screen to be inserted thereinto and output. The screen editing method of the present invention will be depicted below with reference to FIGS. 5A and 5B.

Figure 5A:
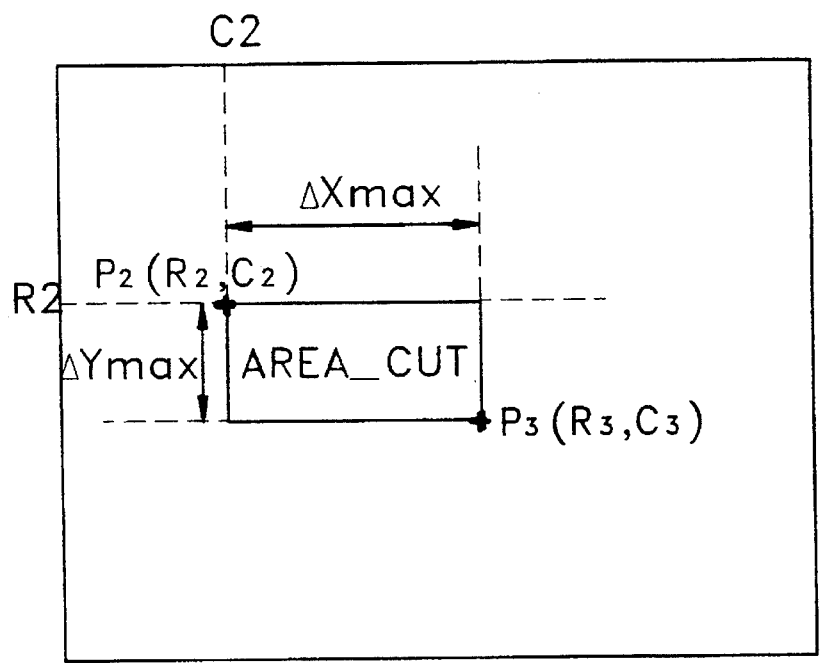
FIGS. 5A and 5B illustrate an inserting region for a main screen and an extracted region.

FIG. 5A shows the extracted region for the subscreen. Here, it is noted that the extracted region is at least part of the subscreen and contains the screen information to be inserted into a location of the main screen. In order to designate the extracted region, at least two sets of coordinates are required. That is, suppose that the extracted screen is to be square, two pairs of diagonal apex coordinates [P2 (R2, C2) and P3 (R3, C3)] are required.

Figure 5B:
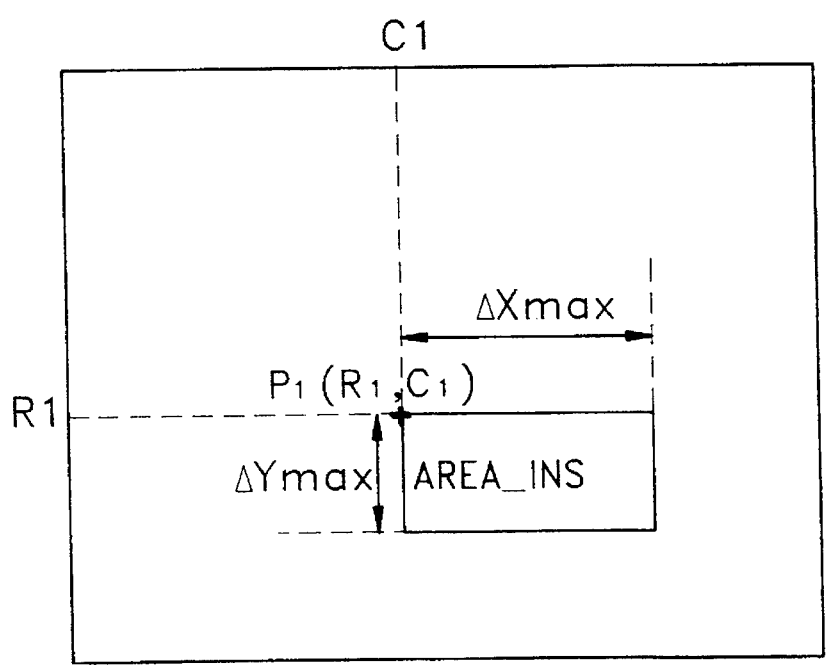

FIG. 5B shows the inserting region of the main screen. Here, an inserting region is at least part of the main screen and is the region where the screen information of the extracted region is to be inserted in FIG. 5A. In order to designate the inserting region, at least one set of coordinates is required, which is an inserting reference point P1 (R1, C1) for indicating the upper left point of the inserting region. Assuming that the form and size of the inserting and extracted regions are the same, the extracted and inserting regions of FIGS. 5A and 5B can be expressed in terms of $\Delta Y$ and $\Delta X$ (i.e., row and column region increments).

$$\begin{aligned}
\text{Extracted region} &= \text{AREA } [P2 - P3] \\
&= \text{AREA } [(R2, C2) - \\
&\quad (R2 + \Delta Y\text{max}, C2 + \Delta X\text{max})] \\
\text{Inserting region} &= \text{AREA } [(R1, C1) - \\
&\quad (R1 + \Delta Y\text{max}, C1 + \Delta X\text{max})]
\end{aligned}$$

Here, column region increment $\Delta X = C3 - C2$ (0, 1, 2, . . . , $\Delta X$max), while row region increment $\Delta Y = R3 - R2$ (0, 1, 2, . . . , $\Delta Y$max)

A process where the extracted region of FIG. 5A is inserted into the inserting region of FIG. 5B to be edited and output will be described below.

First, a main screen having the inserting region is read out and sequentially output on a pixel-by-pixel basis. The read address (R,C) of the main screen is compared with the address (R1, C1) of an inserting reference point. If the read address (R,C) falls within the following range, (R1, C1)$\leq$(R,C)$\leq$(R1+$\Delta Y$max, C1+$\Delta X$max), the pixels of the extracted region of a subscreen are read out and output instead of those of the main screen. For instance, if the address of a pixel included in the main screen's inserting region is (R1+$\Delta Y$, C1+$\Delta X$), a pixel having the address (R2+$\Delta Y$, C2+$\Delta X$) is read out of the second memory 330 and then output from the corresponding subscreen's extracted region. In other words, in the process of reading out the main screen's pixels and outputting them to the TPH, the corresponding extracted region of the subscreen is output instead of the inserting region of the main screen, so as to obtain an edited screen.

The screen editor of the present invention reduces the overall cost of the system because it does not require an additional memory. This is accomplished by inserting the subscreen's extracted region into the main screen's inserting region in the middle of outputting the main screen. The screen editor of the present invention will be described below with reference to FIGS. 3, 4 and 6.

In FIG. 3, address generator 340 receives editing data from controller 350 and generates address ADDR supplied to the memories and selection signal SELECT_OUT to output selection switch 360. The editing data from controller 350 contains address (R1, C1) of the inserting reference point, address (R2, C2) of the extracting reference point, and row and column region increments ΔYmax and ΔXmax of the regions. The editing data [(R1, C1), (R2, C2), and ΔXmax and ΔYmax] is what the coordinates supplied from coordinates designator 390 are converted into, and is operated on by controller 350 to be suitable for the addresses of memories 320 and 330.

Figure 4:
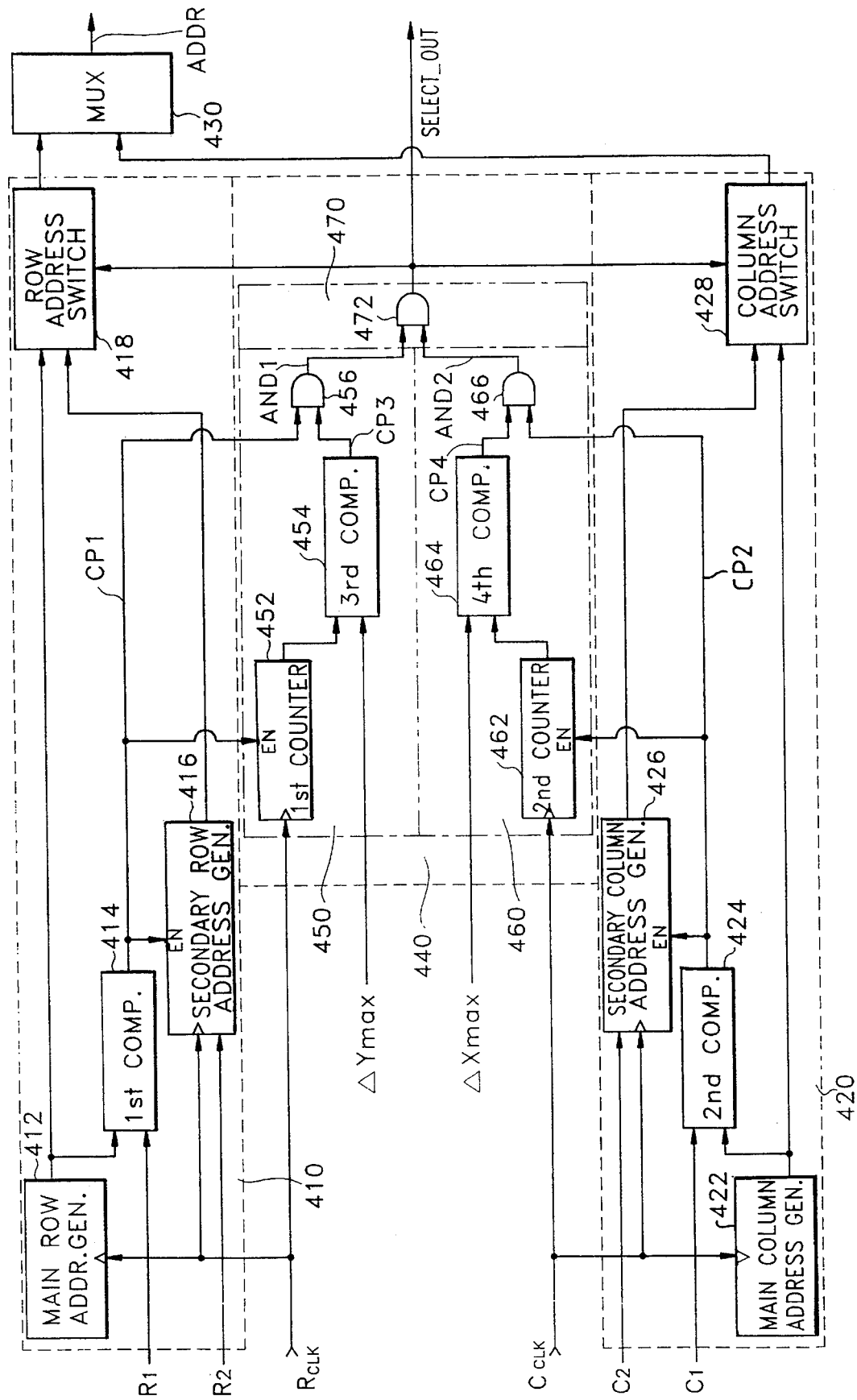
FIG. 4 illustrates the address generator shown in FIG. 3.

Referring to FIG. 4 illustrating the address generator (340) in detail, among the addresses supplied to memories 320 and 330, a row address generator 410 generates a row address and a column address generator 420 generates a column address. The row address from row address generator 410 and the column address from column address generator 420 are mixed by a multiplexer 430, to be supplied to memories 320 and 330 of FIG. 3. A region signal generator 440 receives the inserting reference point (R1, C1) and region increments (ΔXmax and ΔYmax) to generate selection signal SELECT_OUT.

Row address generator 410 comprises a main row address generator 412 for sequentially generating the row addresses for first memory 320 of FIG. 3, a secondary row address generator 416 for generating the row addresses of the extracted region for second memory 330 of FIG. 3, a first comparator 414 for comparing the row addresses from main row address generator 412 with row address R1 of the inserting reference point and, when the row addresses from main address generator 412 are equal to or greater than row address R1, generating a signal for enabling secondary row address generator 416, and a row address switch 418 for selecting and outputting either of the row addresses from main row address generator 412 and secondary row address generator 416 in response to selection signal SELECT_OUT from region signal generator 440.

Main row address generator 412 counts a row clock signal $R_{clk}$ to repeatedly generate row addresses from row 0 to the final row Re. The number of repetitions equals the number of column addresses. The row addresses from main row address generator 412 are supplied to switch 418 and first comparator 414. First comparator 414 compares the row addresses from main row address generator 412 with row address R1 of the inserting reference point and, when the row addresses from main row address generator 412 are equal to or greater than row address R1, generates the signal for enabling secondary row address generator 416. For instance, when the row address from main row address generator 412 is equal to or greater than row address R1 of the inserting reference point, first comparator 414 generates a high logic signal. Secondary row address generator 416 first takes row address R2 of the extracting reference point as a preset value, is enabled by the signal from first comparator 414, and then counts row clock $R_{CLK}$ to generate row addresses from R2 to Re. The row addresses from main row address generator 412 and secondary row address generator 416 are supplied to row address switch 418 which selects either of the row addresses from main row address generator 412 and secondary row address generator 416 according to selection signal SELECT_OUT from region signal generator 440 and then supplies the selected address to multiplexer 430.

A column address generator 420 comprises a main column address generator 422 for sequentially generating the column addresses of second memory 330 of FIG. 3, a secondary column address generator 426 for generating the column addresses of the extracted region of second memory 330 of FIG. 3, a second comparator 424 for comparing the column addresses from main column address generator 422 with column address C1 of the inserting reference point and, when the column addresses from main column address generator 422 are equal to or greater than column address C1, generating a signal for enabling secondary column address generator 426, and a column address switch 428 for selecting and outputting either of the column addresses from main column address generator 422 and secondary column address generator 426 in response to selection signal SELECT_OUT from region signal generator 440.

Main column address generator 422 counts a column clock signal $C_{CLK}$ to repeatedly generate column addresses from column 0 to the final column Ce. The column addresses from main column address generator 422 are supplied to switch 428 and second comparator 424. Second comparator 424 compares the column addresses from main column address generator 422 with column address C1 of the inserting reference point and, when the column addresses from main column address generator 422 are equal to or greater than column address C1, generates the signal for enabling secondary column address generator 426. For instance, when the column addresses from main column address generator 422 are equal to or greater than column address C1 of the inserting reference point, second comparator 424 generates a high logic signal. Secondary column address generator 426 takes column address C2 of the extracting reference point as a preset value, is enabled by the signal from second comparator 424, and then counts column clock $C_{CLK}$ to generate column addresses from C2 to Ce. The column addresses from main column address generator 422 and secondary column address generator 426 are supplied to column address switch 428 which selects either of the column addresses from main column address generator 422 and secondary column address generator 426 according to selection signal SELECT_OUT from region signal generator 440 and supplies the selected address to multiplexer 430.

Region signal generator 440 comprises a row region signal generator 450, a column region signal generator 460 and a mixer 470 for mixing the region signals from row region signal generator 450 and column region signal generator 460. Row region signal generator 450 comprises a first counter 452 for counting row clock $R_{CLK}$, a third comparator 454 for comparing the output of the first counter with ΔYmax from controller 350, and an AND gate 456 for AND-operating the compared outputs of third comparator 454 and first comparator 414. Column region signal generator 460 comprises a second counter 462 for counting column clock $C_{CLK}$, a fourth comparator 464 for comparing the output of the second counter with ΔXmax from controller 350, and an AND gate 466 for AND-operating the compared outputs of fourth comparator 464 and second comparator 424. Mixer 470 has an AND gate 472 for AND-operating the logic outputs of the AND gates.

Row region signal generator 450 generates a signal for indicating a period corresponding to the distance from the inserting reference point to row region increment ΔYmax. First counter 452 is enabled by compared output CP1 from first comparator 414 to count clock $R_{CLK}$ and supplies the counted output to third comparator 454. Third comparator 454 compares the counted output from first counter 452 and row region increment ΔYmax, and when the counted output from first counter 452 is smaller than row region increment ΔYmax, supplies high-logic compared output CP3 to AND gate 456. AND gate 456 AND-operates compared output CP3 from third comparator 454 with compared output CP1 from first comparator 414, and supplies logic output AND1 to AND gate 472.

Column region signal generator 460 generates a signal for indicating a period corresponding to the distance from the inserting reference point to column region increment ΔXmax. Second counter 462 is enabled by compared output CP2 from second comparator 424 to count clock column $C_{CLK}$ and supplies the counted output to fourth comparator 464. Fourth comparator 464 compares the counted output from second counter 462 and column region increment ΔXmax, and when the counted output from second counter 462 is smaller than column region increment ΔXmax, supplies high-logic compared output CP4 to AND gate 466. AND gate 466 AND-operates compared output CP4 from fourth comparator 464 with compared output CP2 from second comparator 424, and supplies logic output AND2 to AND gate 472.

AND gate 472 AND-operates signals AND1 and AND2 and supplies logic output SELECT_OUT to output selection switch 360 of FIG. 3, row address switch 418 and column address switch 428.

Figure 6:
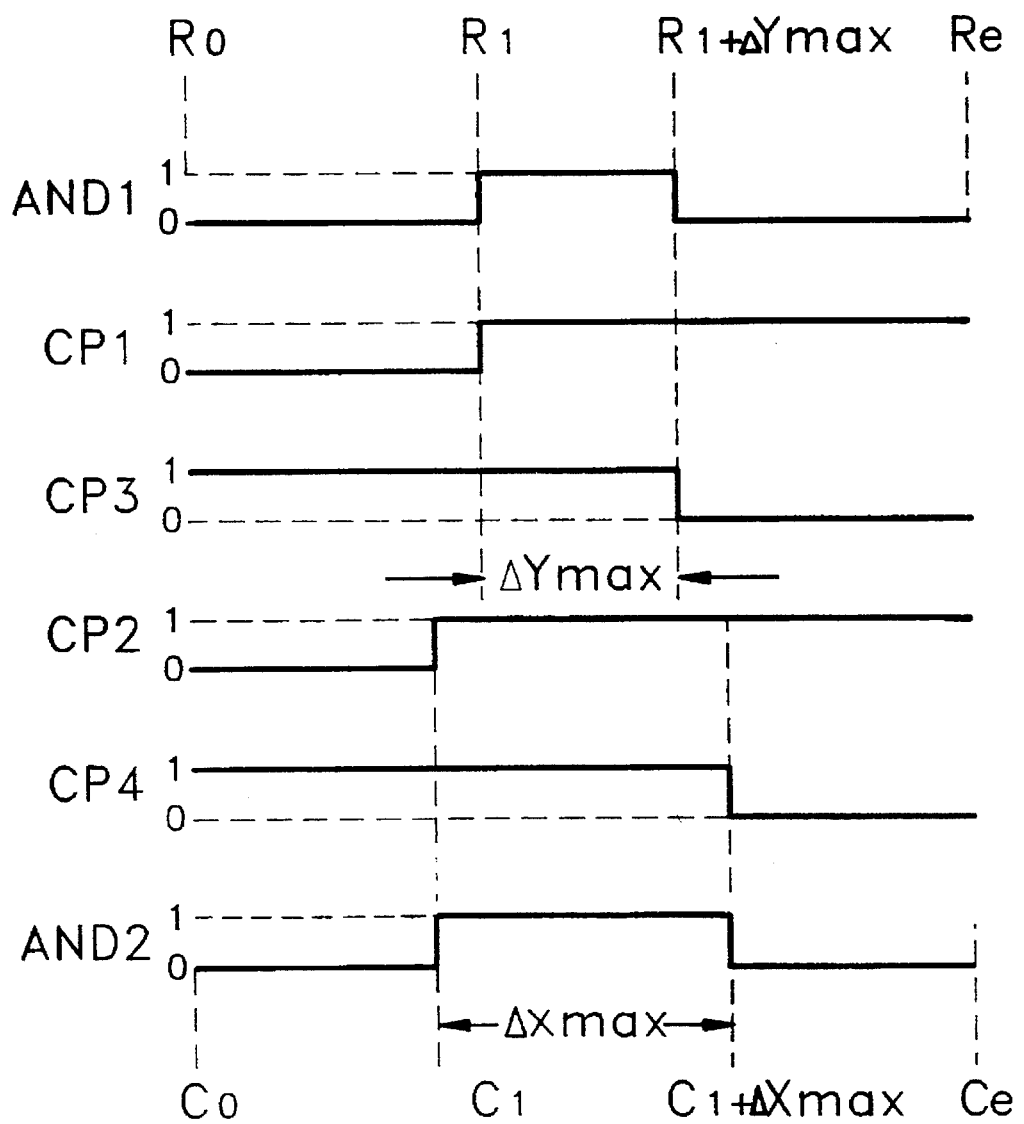
FIG. 6 illustrates waveforms of respective components shown in FIG. 4.

Referring to FIG. 6, compared output CP1 from first comparator 414 stays high during the period from row address R1 of the inserting reference point to the final row address Re thereof. Compared output CP3 from third comparator 454 stays high during the period from the first row address R0 to the final row address R1+ΔYmax of the inserting region. Thus, logic output AND1 from AND gate 456 stays high during the period from row address R1 of the inserting reference point to the final row address R1+ΔYmax of the inserting region. Compared output CP2 from second comparator stays high during the period from column address C1 of the inserting reference point to the final column address Ce. Compared output CP4 from fourth comparator 464 stays high during the period from the first column address C0 to the final column address R1+ΔXmax of the inserting region. Logic output AND2 from AND gate 466 stays high during the period from column address C1 of the inserting reference point to the final column address R1+ΔXmax of the inserting region. As a result, logic output SELECT_OUT of AND gate 472 indicates inserting region AREA_INS of FIG. 5B.

Figure 1:
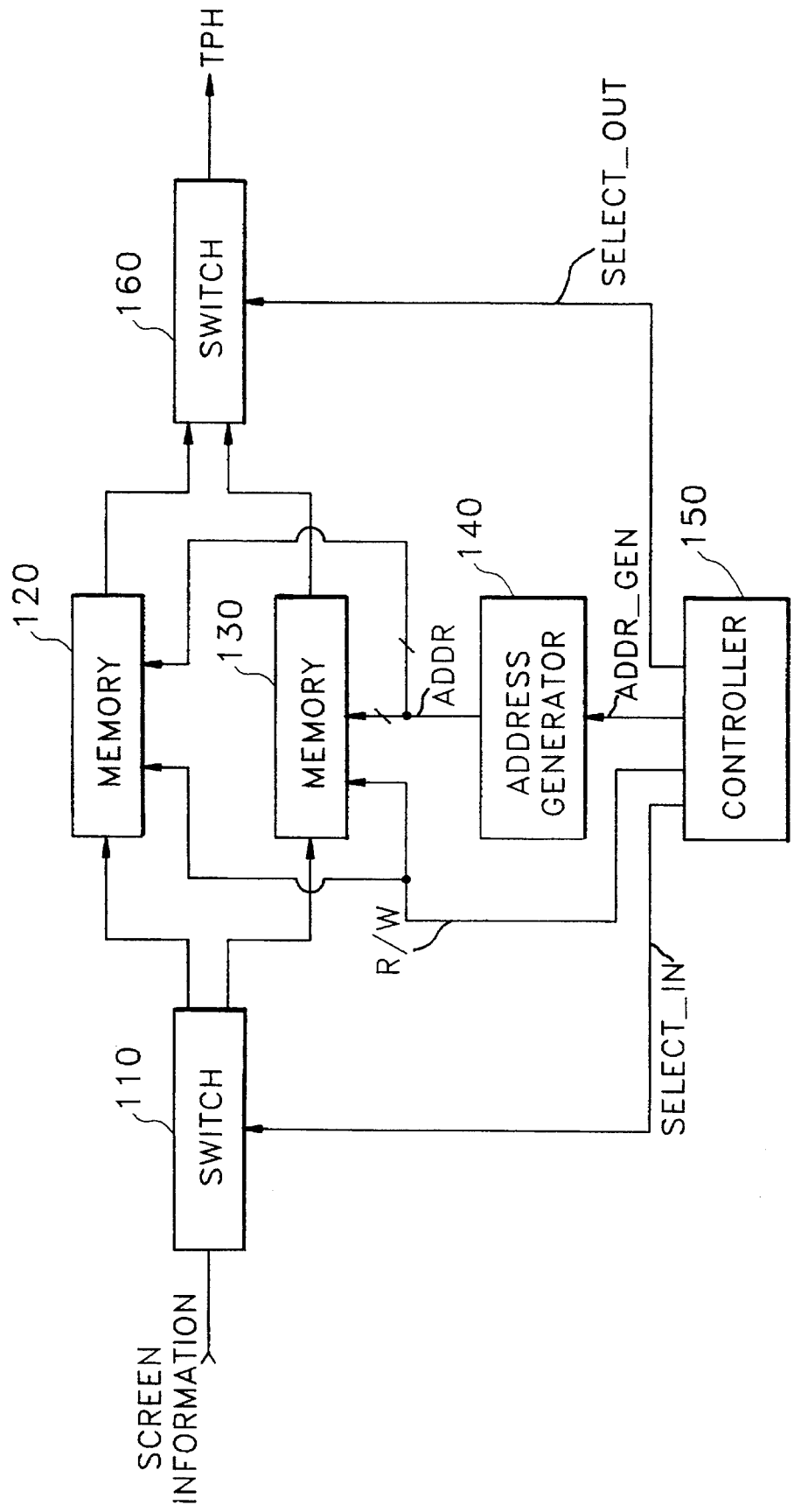
FIG. 1 illustrates a screen output apparatus for a conventional video printer.
Figure 2:
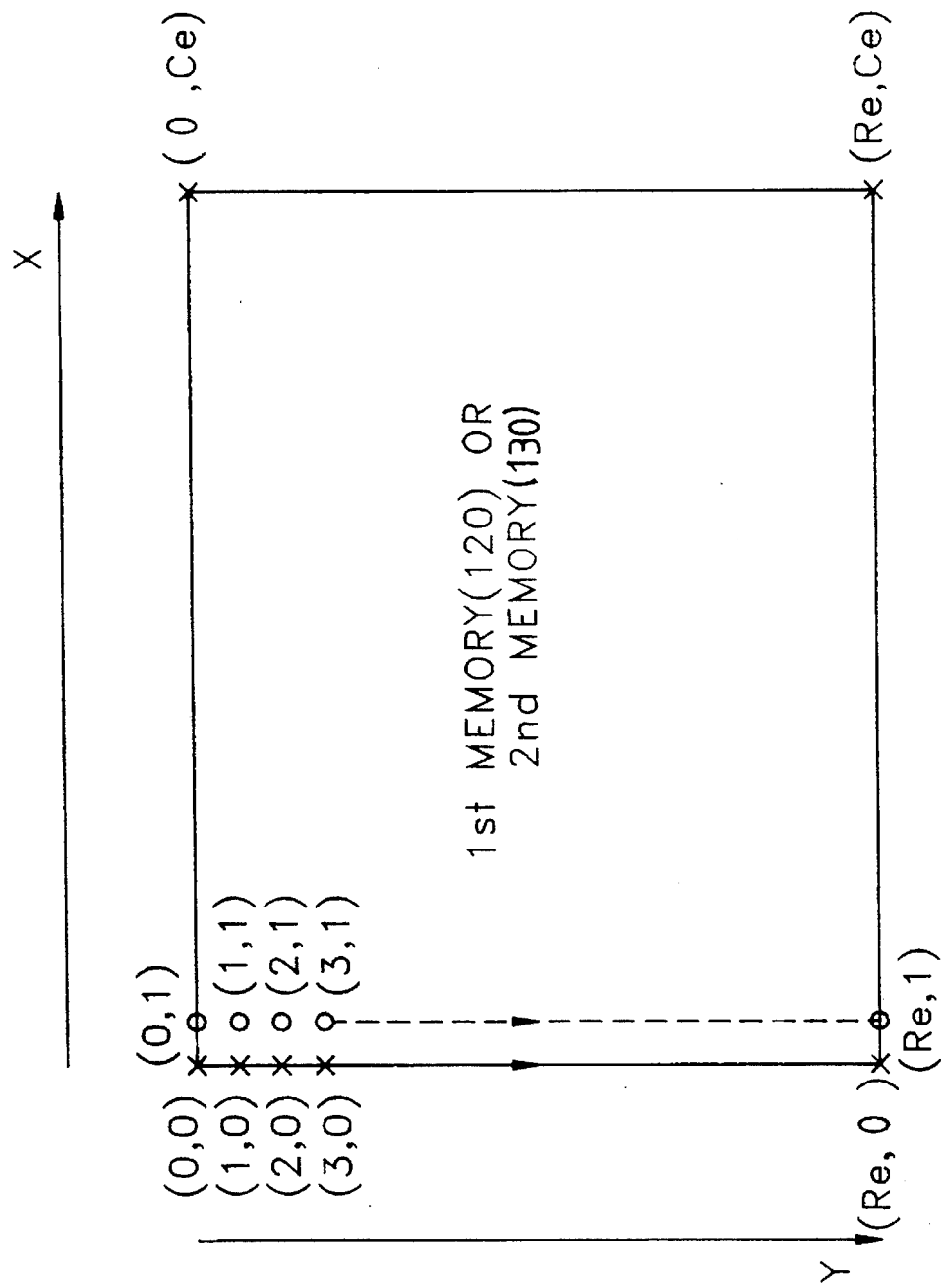
FIG. 2 illustrates a process of reading out screen information stored in the memories of FIG. 1.

Without an additional addressing device such as address generator 140 of FIG. 1, the screen editor of the present invention can select either of memories 320 and 330 and outputs the contents of the selected one. The selection of either of memories 320 and 330 is possible by properly choosing the editing data transmitted from controller 350 to address generator 340. For instance, in case of outputting only the screen information stored in first memory 320, the inserting reference point and extracting reference point should be set as the lower right address (Re,Ce) in FIGS. 5A and 5B, and region increments ΔXmax and ΔYmax should be as 1. Thus, output selection signal SELECT_OUT of region signal generator 440 of address generator 340 selects only first memory 320 so as to output only the screen information of first memory 320. In case of outputting only the screen information stored in second memory 330, the inserting reference point and extracting reference point should be set to the upper left address (0,0) in FIGS. 5A and 5B, and region increments ΔXmax and ΔYmax should be set to maximum values Re and Ce.

In a screen editing method of the present invention, the screen editing can be processed in real time without using an additional memory, thereby reducing the burden of the controller, e.g., a microprocessor, and enhancing the overall system.

In the embodiment of the present invention, the coordinates designator designates two diagonal points of the extracted region of the subscreen and an inserting reference point of the main screen, the controller, based upon the coordinates, calculates editing data containing extracting reference points, the inserting reference point and region increments, and the address generator performs screen editing, based upon the editing data of the controller. However, it would be obvious to those skilled in controlling a memory that the coordinates designated by the coordinates designator could be directly input to the address generator so as to perform the screen editing. In such a case, a device for operating the region increments is included in the address generator of the present invention. When data for only one screen is output among the two screens of information stored in the memories, an editing/selecting mode signal may be applied to the first and second comparators of the address generator as an enable signal so as to suppress the operations of the secondary row address generators and region signal generator.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. In a video printer, a screen editor for extracting part of one screen to insert the part into another screen to form a composite screen and then output a resulting image, said editor comprising:

first and second memories for storing input screen data representing a main screen and a subscreen, respectively, a section of said subscreen is to be inserted in said main screen;

output selection switch means coupled to said first and second memories for sending out either of the input screen data read out from said first or second memories;

coordinates designator means for designating coordinates corresponding to an extracted region including an extracted reference point and region increments of said second memory and an inserting reference point of said first memory;

controller means coupled to said first and second memories and to said coordinates designator means for, based upon the coordinates designated by said coordinates designator means, calculating editing data related to addresses of the inserting reference point, extracting reference point and region increments; and address generator means coupled to said first and second memories and to said controller for, based upon the editing data of said controller means, generating read addresses of said first and second memories and controlling said output selection switch means to send screen data from said first memory until the inserting reference point is reached and subsequently sending screen data from said second memory beginning from the extracting reference point and continuing over the region increments to generate a resulting image wherein the extracting region is inserted into the screen data of the first memory beginning at the inserting reference point.

2. A screen editor as claimed in claim 1, wherein said address generator means comprises:

row address generator means including main row address generator means for repeatedly generating as many row addresses as a number of column addresses, secondary row address generator means for taking a row address of the extracting reference point as a preset value, first comparator means for comparing the row address output of said main row address generator means with the row address of the inserting reference point so as to enable said secondary row address generator means, and row address switch means for selectively outputting row address outputs of said main row address generator means and secondary row address generator means;

column address generator means including main column address generator means for repeatedly generating as many column addresses as the number of row addresses, secondary column address generator means for taking a column address of the extracting reference point as a preset value, second comparator means for comparing a column address output of said main column address generator means with a column address of the inserting reference point so as to enable said secondary column address generator means, and column address switch means for selectively outputting address outputs of said main column address generator means and secondary column address generator means;

a multiplexer for mixing the address outputs of said row and column address generator means so as to generate the read addresses of said first and second memories; and region signal generator means for, in an inserting region, generating a control signal which makes said row address switch means select an address of said secondary row address switch means and makes said column address switch means select an address of said secondary column address switch means.

3. A screen editor as claimed in claim 2, wherein said region signal generator means comprises:

row region signal generator means including first counter means enabled by a compared output from said first comparator means, third comparator means for comparing a counted output of said first counter means with a row region increment, and first operating means for AND-operating the compared outputs from said first comparator means and third comparator means;

column region signal generator means including second counter means enabled by the compared output from said second comparator means, fourth comparator means for comparing the counted output of said second counter means with a column region increment, and second operating means for AND-operating the compared outputs from said second comparator means and fourth comparator means; and third operating means for AND-operating the logic outputs of said first and second operating means.

4. A screen editor as claimed in claim 1 further comprising:

display means for displaying an output of said output selection switch means; and second output selection switch means for selectively outputting the output of said output selection switch means to said display means and a thermal print head.

5. In a video printer, a screen editing method for extracting part of one screen to insert the part into another screen, comprising the steps of:

designating part of a secondary screen as an extracted region, and designating a location where screen information of the extracted region is to be inserted in another screen;

comparing a read address of a main screen with an address of the a location to recognize an inserting region; and reading out and outputting the screen information of the extracted region of the secondary screen in the inserting region when the read address of the main screen corresponds to the location.

6. In a video printer, a screen editor for extracting part of one screen to insert the into another screen to form a composite screen and then output a resulting image, said editor comprising:

first and second memories for storing input screen data representing a main screen and a subscreen, respectively, a section of said subscreen is to be inserted in said main screen;

output selection switch means coupled to said first and second memories for sending out either of the input screen data read out from said first or second memories;

coordinates designator means for designating coordinates corresponding to an extracted region including an extracted reference point and region increments of said second memory and an inserting reference point of said first memory;

controller coupled to said first and second memories and to said coordinates designator means for, based upon the coordinates designated by said coordinates designator means, calculating editing data related to addresses of the inserting reference point, extracting reference point and region increments; and address generator means coupled to said first and second memories and to said controller for, based upon the editing data of said controller means, generating read addresses of said first and second memories and controlling said output selection switch means, wherein said address generator means comprises;

row address generator means including main row address generator means for repeatedly generating as many row addresses as a number of column addresses, secondary row address generator means for taking a row address of the extracting reference point as a preset value, first comparator means for comparing the row address output of said main row address generator means with the row address of the inserting reference point so as to enable said secondary row address generator means, and row address switch means for selectively outputting row address outputs of said main row address generator means and secondary row address generator means;

column address generator means including main column address generator means for repeatedly generating as many column addresses as the number of row addresses, secondary column address generator means for taking a column address of the extracting reference point as a preset value, second comparator means for comparing a column address output of said main column address generator means with a column address of the inserting reference point so as to enable said secondary column address generator means, and column address switch means for selectively outputting address outputs of said main column address generator means and secondary column address generator means;

a multiplexer for mixing the address outputs of said row and column address generator means so as to generate the read addresses of said first and second memories; and region signal generator means for, in an inserting region, generating a control signal which makes said row address switch means select an address of said secondary row address switch means and makes said column address switch means select an address of said secondary column address switch means.

7. A screen editor as claimed in claim 6, wherein said region signal generator means comprises:

row region signal generator means including first counter means enabled by a counted output of said first counter means with a row region increment, and first operating means for AND-operating the compared outputs from said first comparator means and third comparator means;

column region signal generator means including second counter means enabled by the compared output from said second comparator means, fourth comparator means for comparing the counted output of said second counter means with a column region increment, and said operating means for AND-operating the compared outputs from said second comparator means and fourth comparator means; and third operating means for AND-operating the logic outputs of said first and second operating means.

\* \* \* \* \*